US012663103B2

(12) United States Patent
Zhao et al.

(10) Patent No.: US 12,663,103 B2
(45) Date of Patent: Jun. 23, 2026

(54) HOSE, HOSE ASSEMBLY, AND MANUFACTURE METHOD

(71) Applicant: LUOHE LETONE HYDRAULICS TECHNOLOGY CO., LTD., Luohe (CN)

(72) Inventors: Hongliang Zhao, Luohe (CN); Zhian Liu, Luohe (CN); Peiyuan Wu, Luohe (CN); Feilong Zhang, Luohe (CN); Xingpeng Yang, Luohe (CN); Lili Lu, Luohe (CN); Yong Zhang, Luohe (CN); Yanhui Zhao, Luohe (CN); Pengfei Zhang, Luohe (CN); Ning Li, Luohe (CN)

(73) Assignee: LUOHE LETONE HYDRAULICS TECHNOLOGY CO., LTD., Luohe (CN)

( * ) Notice: Subject to any disclaimer, the term of this patent is extended or adjusted under 35 U.S.C. 154(b) by 323 days.

(21) Appl. No.: 18/226,798

(22) Filed: Jul. 27, 2023

(65) Prior Publication Data

US 2024/0117903 A1 Apr. 11, 2024

Related U.S. Application Data

(60) Provisional application No. 63/439,602, filed on Jan. 18, 2023.

(30) Foreign Application Priority Data

Sep. 23, 2022 (CN) ......................... 202222549443.9
Jan. 10, 2023 (CN) ......................... 202310035390.5
(Continued)

(51) Int. Cl.
  *F16L 11/24*  (2006.01)
  *F16L 11/04*  (2006.01)

(52) U.S. Cl.
  CPC ............. *F16L 11/24* (2013.01); *F16L 11/045* (2013.01)

(58) Field of Classification Search
  CPC ................................ F16L 11/24; F16L 11/045
  (Continued)

(56) References Cited

U.S. PATENT DOCUMENTS 840,536 A * 1/1907 Weir ....................... F16L 33/01
  138/120
4,564,222 A * 1/1986 Loker ..................... F16L 33/18
  285/321
(Continued)

FOREIGN PATENT DOCUMENTS

CN 201152422 Y 11/2008
CN 102143833 A 8/2011
(Continued)

OTHER PUBLICATIONS

The 1st Office Action regarding Chinese Patent Application No. CN202310085327.2, Mailing date: Jan. 31, 2024.
(Continued)

*Primary Examiner* — David R Deal
(74) *Attorney, Agent, or Firm* — Yue (Robert) Xu; Apex Attorneys at Law, LLP

(57) ABSTRACT

An ultrahigh-pressure acid-fracturing isodiametric hose assembly, comprising a hose body and a metal joint. The metal joint comprises an inner tube, a first outer tube the inner tube, and a second outer tube. The first outer tube and the second outer tube each is an independent pressing part. An external groove is provided at an outer wall of the inner tube. An end of the first outer tube comprises an internal ridge which matches the external groove for snapping. The terminal of the inner tube comprises a connecting portion. An outer wall of the inner tube comprises a first protrusion, (Continued)

and an inner wall of the first outer tube comprises a second protrusion engaging with the first protrusion. The hose body is clamped between the first protrusion and the second protrusion that are engaged. An inner wall of the second outer tube comprises multiple micro-protrusions.

20 Claims, 6 Drawing Sheets

(30)  Foreign Application Priority Data

Feb. 6, 2023  (CN) ......................... 202310085327.5
Feb. 17, 2023  (CN) ......................... 202320251538.4

(58) Field of Classification Search
USPC ....................................................... 138/109
See application file for complete search history.

(56)  References Cited

U.S. PATENT DOCUMENTS

| | | | | |
|---|---|---|---|---|
| 2004/0020545 A1* | 2/2004 | Takagi | ................ | F16L 33/2076 |
| | | | | 138/109 |
| 2004/0066036 A1* | 4/2004 | Estran | .................. | F16L 13/142 |
| | | | | 138/155 |
| 2004/0090067 A1* | 5/2004 | Pridham | .............. | F16L 19/075 |
| | | | | 285/382.7 |
| 2005/0081935 A1* | 4/2005 | Shimizu | .............. | F16L 37/0885 |
| | | | | 138/109 |
| 2006/0266428 A1* | 11/2006 | Pajaro Gonzalez | .. | F16L 57/005 |
| | | | | 138/96 T |
| 2007/0221281 A1* | 9/2007 | Takagi | .................... | F16L 11/11 |
| | | | | 138/139 |
| 2009/0126817 A1* | 5/2009 | Gray | .................. | B29C 63/0013 |
| | | | | 138/116 |
| 2010/0186845 A1* | 7/2010 | Knotten | ................ | F16L 11/133 |
| | | | | 138/104 |
| 2010/0229994 A1* | 9/2010 | Wildermuth | ........ | F16L 33/2078 |
| | | | | 138/109 |
| 2019/0024832 A1* | 1/2019 | Sugishita | ............ | F16L 33/2073 |
| 2024/0142024 A1* | 5/2024 | Zaborszki | ............... | F16L 33/26 |

FOREIGN PATENT DOCUMENTS

| | | | |
|---|---|---|---|
| CN | 102418818 A | 4/2012 |
| CN | 102679054 A | 9/2012 |
| CN | 102865420 A | 1/2013 |
| CN | 105042220 A | 11/2015 |
| CN | 105443885 A | 3/2016 |
| CN | 205745719 U | 11/2016 |
| CN | 206723666 U | 12/2017 |
| CN | 109595407 A | 4/2019 |
| CN | 110778825 A | 2/2020 |
| CN | 110805757 A | 2/2020 |
| CN | 110805758 A | 2/2020 |
| CN | 111140697 A | 5/2020 |
| CN | 111306374 A | 6/2020 |
| CN | 111853398 A | 10/2020 |
| CN | 211875334 U | 11/2020 |
| CN | 212080454 U | 12/2020 |
| CN | 212455882 U | 2/2021 |
| CN | 112664728 A | 4/2021 |
| CN | 114623294 A | 6/2022 |
| GB | 1334025 A | 10/1973 |
| JP | 2009180311 A | 8/2009 |

OTHER PUBLICATIONS

International Search Report and Written Opinion of the International Searching Authority issued on Nov. 16, 2023 for PCT/CN2023/115237.

* cited by examiner

4

HOSE, HOSE ASSEMBLY, AND MANUFACTURE METHOD

The present disclosure claims the priority to Chinese Patent Application No. 202222549443.9, titled "ULTRA-HIGH-PRESSURE ACID-FRACTURING ISODIAMETRIC HOSE ASSEMBLY", filed on Sep. 23, 2022 with the China National Intellectual Property Administration, Chinese Patent Application No. 202310035390.5, titled "HOSE, HOSE ASSEMBLY, AND MANUFACTURE METHOD", filed on Jan. 10, 2023 with the China National Intellectual Property Administration, Chinese Patent Application No. 202310085327.2, titled "HOSE, HOSE ASSEMBLY, AND MANUFACTURE METHOD", filed on Feb. 6, 2023 with the China National Intellectual Property Administration, Chinese Patent Application No. 202320251538.4, titled "HOSE AND HOSE ASSEMBLY", filed on Feb. 17, 2023 with the China National Intellectual Property Administration, and U.S. Provisional Patent Application No. 63/439,602, titled "HOSE, HOSE ASSEMBLY, AND MANUFACTURE METHOD" filed on Jan. 18, 2023, all of which are incorporated herein by reference in their entireties.

FIELD

This application relates to the technical field of hose connection, and in particular to an ultrahigh-pressure acid-fracturing isodiametric hose assembly, an acid-fracturing hose, and a method of manufacturing an acid-fracturing hose.

BACKGROUND

An acid-fracturing hose assembly is an indispensable part in a shale oil fracturing system, and its sealing determines operation performances of the fracturing system directly.

In conventional technology, a hose and a metal joint are connected through pressing on an inner tube and an outer tube. The hose and the metal joint are apt to separate under a high in-pipe pressure or a large stretch. The connection has poor sealing which facilitates leakage, and has a complex process and a high cost when being manufactured.

Hence, it is urgent for those skilled in the art to provide a solution addressing the troublesome connection between the hose and the metal joint.

SUMMARY

An objective of embodiments of the present disclosure is to provide an ultrahigh-pressure acid-fracturing isodiametric hose assembly, an acid-fracturing hose, and a method for manufacturing an acid-fracturing hose. High in-pipe pressure and a large stretch are permitted without detachment between the hose and the metal joint, a sealing performance is excellent, and leakage is more improbable.

In order to address the above issue, following technical solutions are provided according to embodiments of the present disclosure.

An ultrahigh-pressure acid-fracturing isodiametric hose assembly is provided, comprising a hose body and a metal joint. The metal joint comprises an inner tube, a first outer tube which is configured to serve as a sleeve outside the inner tube, a second outer tube which is configured to serve as a sleeve outside an outer wall of the first outer tube, and a threaded ring configured to be connected with a terminal of the inner tube via a thread. The first outer tube is capable to press against the inner tube independently, and the second outer tube is capable to press against the outer wall of the first outer tube independently. An external groove for snapping is provided at an outer wall of the threaded ring. An end of the first outer tube comprises an internal ridge for snapping which matches the external groove for snapping. The terminal of the inner tube comprises a connecting portion. An outer wall of the inner tube comprises a first protrusion, and an inner wall of the first outer tube comprises a second protrusion configured to engage with the first protrusion. The hose body when connecting with the metal joint is clamped between the first protrusion and the second protrusion that are engaged. An inner wall of the second outer tube comprises multiple micro-protrusions.

In an embodiment, the outer wall of the inner tube comprises a hose barb, a height of the hose barb is smaller than a height of the first protrusion, and the hose barb is arranged close to a tail end of the inner tube.

In an embodiment, the inner wall of the first outer tube comprises multiple micro-rectangular protrusions, a height of each micro-rectangular protrusion is smaller than a height of the second protrusion, and the micro-rectangular protrusions are arranged close to a tail end of the first outer tube.

In an embodiment, the first protrusion, the second protrusion, and the micro-rectangular protrusions each is chamfered with a circular arc.

In an embodiment, the tail end of the inner tube comprises a tapered buffer portion and an isodiametric buffer portion, and the tapered buffer portion is connected with the hose barb.

In an embodiment, when the first outer tube presses against the inner tube and the second outer tube presses against the outer wall of the first outer tube, an extension portion of the tail end of the inner tube extends out of a tail end of the second outer tube, and the tapered buffer portion and the isodiametric buffer portion are located at the extension portion.

In an embodiment, the hose body comprises an ultra-high-molecular-weight wear-resistant inner lining layer, an inner rubber protective layer, a skeleton layer, an outer fiber-fabric layer, and an outer rubber protective layer, which are arranged from inside to outside. The skeleton layer comprises an inner fiber-fabric layer, multiple rubber wrapping layers, and multiple steel-wire winding layers.

The first protrusion, the second protrusion, and the micro-rectangular protrusions each is meshed with an inner surface or an outer surface of the skeleton layer.

In an embodiment, a distance between the first protrusion and the corresponding surface of the skeleton layer ranges from 2 mm to 5 mm, and a distance between the second protrusion and the corresponding surface of the skeleton layer ranges from 2 mm to 5 mm;

An outer diameter of the first outer tube close to the tail end of the first outer tube is smaller than an outer diameter of the first outer tube close to the threaded ring by a difference ranging from 2 mm to 4 mm.

In an embodiment, an inner wall of the hose body comprises a hose inner layer, an outer diameter of the inner tube is identical to an inner diameter of the hose inner layer, and when the hose body is connected with the metal joint, the inner tube grips the hose inner layer through the hose barb being engaged with the hose inner layer.

In an embodiment, an outer wall of the hose body comprises a hose outer layer, and the hose assembly further comprises a sealant applied between the second outer tube and the hose outer layer, and an end-face of the hose outer layer abuts against an end-face of the tail end of the first outer tube.

An acid-fracturing hose is provided, comprising the hose body of any foregoing ultrahigh-pressure acid-fracturing isodiametric hose assembly according to any one of the above. The skeleton layer of the hose body comprises the multiple steel-wire winding layers which are sequentially arranged along a radical direction of the hose body. An innermost one of the steel-wire winding layers is a steel-wire winding layer having a sequential number of 1. A winding angle of a steal wire in each steel-wire winding layer with an odd sequential number is u, and a ranges from 53.0 degrees to 54.0 degrees. A periodical length of a steel wire in one of the steel-wire winding layers which has a sequential number of n is identical to a periodical length of a steel wire in another of the steel-wire winding layers which has a sequential number of n−1, when n is an even number.

In an embodiment, the hose body comprises the ultrahigh-molecular-weight wear-resistant inner lining layer, the inner rubber protective layer, a first intermediate rubber layer, the inner fiber-fabric layer, a second intermediate rubber layer, the skeleton layer, a twelfth intermediate rubber layer, the outer fiber-fabric layer, and the outer rubber protective layer which are arranged from inside to outside.

The hose inner layer comprises the ultrahigh-molecular-weight wear-resistant inner lining layer and the inner rubber protective layer.

The hose outer layer comprises the twelfth intermediate rubber layer, the outer fiber-fabric layer and the outer rubber protective layer.

In an embodiment, a corrosion-resistant anti-leakage layer is provided between the inner rubber protective layer and the skeleton layer.

In an embodiment, a surface of each steel-wire winding layer is coated with brass.

In an embodiment, the ultrahigh-molecular-weight wear-resistant inner lining layer comprises films of which a quantity ranging from 8 to 12, and a thickness of each of the films is 0.15 mm.

A thickness of the inner rubber protective layer ranges from 9 mm to 11 mm.

The corrosion-resistant anti-leakage layer comprises other films of which a quantity ranging from 4 to 6, and a thickness of each of the other films is 0.15 mm.

A thickness of each intermediate rubber layer ranges from 0.3 mm to 0.6 mm.

A thickness of the outer rubber protective layer ranges from 2.5 mm to 4.0 mm.

The inner fiber-fabric layer and the outer fiber-fabric layer each comprises multiple layers of cord fabric, and a thickness of each layer of cord fabric ranges from 0.8 mm to 1.2 mm.

A method for manufacturing an acid-fracturing hose comprises: wrapping a core rod with an ultrahigh-molecular-weight film, and performing hot vulcanization on the ultrahigh-molecular-weight film to acquire an ultrahigh-molecular-weight wear-resistant inner lining layer; extruding an inner rubber out of the ultrahigh-molecular-weight wear-resistant inner lining layer, and then covering the ultrahigh-molecular-weight wear-resistant inner lining layer with the inner rubber protective layer; laying a corrosion-resistant anti-leakage layer, a first intermediate rubber layer, an inner fiber-fabric layer, a second intermediate rubber layer, a skeleton layer, a twelfth intermediate rubber layer, an outer fiber-fabric layer, and an outer rubber protective layer in the above-listed sequence on the inner rubber protective layer to obtain a composite layer; and vulcanizing the composite layer to obtain the acid-fracturing hose.

In an embodiment, laying the corrosion-resistant anti-leakage layer, the first intermediate rubber layer, the inner fiber-fabric layer, the second intermediate rubber layer, the skeleton layer, the twelfth intermediate rubber layer, the outer fiber-fabric layer, and the outer rubber protective layer in the above-listed sequence on the inner rubber protective layer comprises: laying the corrosion-resistant anti-leakage layer on the inner rubber protective layer; wrapping the corrosion-resistant anti-leakage layer with the first intermediate rubber layer and then the inner fiber-fabric layer, then performing another hot vulcanization on the inner fiber-fabric layer, and then applying an adhesive uniformly on the inner fiber-fabric layer; and wrapping the inner fiber-fabric layer with the second intermediate rubber layer, the skeleton layer, the twelfth intermediate rubber layer, the outer fiber-fabric layer and the outer rubber protective layer in the above-listed sequence.

In an embodiment, wrapping the core rod with the ultrahigh-molecular-weight film and performing hot vulcanization on the ultrahigh-molecular-weight film to acquire the ultrahigh-molecular-weight wear-resistant inner lining layer comprises: wrapping the core rod with a first ultrahigh-molecular-weight film, and performing the hot vulcanization on the first ultrahigh-molecular-weight film to acquire the ultrahigh-molecular-weight wear-resistant inner lining layer, where a temperature of the hot vulcanization ranges from 145° C. to 155° C., and duration of the hot vulcanization ranges from 30 min to 40 min.

Performing the other hot vulcanization on the inner fiber-fabric layer and then applying the adhesive uniformly on the inner fiber-fabric layer comprises: performing the other hot vulcanization on the inner fiber-fabric layer and then applying the adhesive on the inner fiber-fabric layer, where a temperature for the other vulcanization ranges from 155° C. to 165° C., and duration of the other vulcanization ranges from 10 min to 15 min.

Vulcanizing the composite layer to obtain the acid-fracturing hose comprises: disposing the composite layer under pressure ranging from 0.5 Mpa to 0.6 Mpa and a temperature ranging from 150° C. to 170° C. for one hour and then lowering the temperature to implement the vulcanizing and obtain the acid-fracturing hose.

In an embodiment, the method further comprises forming the inner rubber protective layer using raw materials, where the raw materials in parts by weight comprises: 20 to 26 parts of natural rubber; 50 to 60 parts of styrene-butadiene rubber; 15 to 20 parts of sodium acrylate ionic polymer; 3 to 8 parts of zinc oxide; 0.2 to 0.8 part of sulfur; 6 to 8 parts of vulcanization accelerator; 68 to 72 parts of reinforcing agent; 15 to 20 parts of softener; 3 to 8 parts of tackifying resin; 1 to 5 parts of antioxidant; and 0.1 to 0.5 parts of anti-caking agent.

In an embodiment, the method further comprises forming the inner rubber protective layer using raw materials, where the raw materials in parts by weight comprise: 24 parts of natural rubber; 58 parts of styrene-butadiene rubber; 18 parts of sodium acrylate ionic polymer; 5 parts of zinc oxide; 0.5 part of sulfur; 7 parts of vulcanization accelerator; 70 parts of reinforcing agent; 18 parts of softener; 5 parts of tackifying resin; 3 parts of antioxidant; and 0.3 parts of anti-caking agent.

In an embodiment, the method comprises: weighing, in parts by weight, raw materials comprising 20 to 26 parts of natural rubber, 50 to 60 parts of styrene-butadiene rubber, 15 to 20 parts of sodium acrylate ionic polymer, 3 to 8 parts of zinc oxide, 0.2 to 0.8 part of sulfur, 6 to 8 parts of vulcanization accelerator, 68 to 72 parts of reinforcing agent, 15 to 20 parts of softener, 3 to 8 parts of tackifying resin, 1 to 5 parts of antioxidant, and 0.1 to 0.5 parts of anti-caking agent; mixing the raw materials uniformly, then melting the raw materials at a temperature ranging from 80 to 100° C., and then performing glue discharging of the raw materials under 110° C. to obtain a glue-discharged mixture; and melting the glue-discharged mixture, 0.2 to 0.8 parts of sulfur and 6 to 8 parts of vulcanization accelerator for duration ranging from 2 min to 5 min under a temperature ranging from 86° C. to 88° C. to obtain the inner rubber protective layer.

Herein the ultrahigh-pressure acid-fracturing isodiametric hose assembly comprises the hose body and the metal joint. The metal joint comprises the inner tube, the first outer tube, the second outer tube, and the threaded ring. The hose body is pressed and clamped between the inner tube and a combination of the first outer tube, the second outer tube and the threaded ring in the metal joint. The first outer tube is the sleeve outside the inner tube, and the second outer tube the sleeve outside the outer wall of the first outer tube. The inner wall of the second outer tube comprises multiple micro-protrusions which press against the outer wall of the first outer tube tightly. Using double outer tubes, in which the first outer tube and the second outer tube each is an independent pressing part, can improve a utilization rate of materials, reduce deformation of the stressed outer tube when pressing, and strengthen anti-pressure capability of the hose assembly.

The threaded ring has internal threads, the terminal of the inner wall has external threads, and the threaded ring is connected with the terminal of the inner tube via these threads, which facilitates assembling and disassembling. The outer wall of the threaded ring comprises the external groove for snapping, a terminal of the first outer tube comprises an internal ridge for snapping, which matches the external groove for snapping, and the first outer tube is connected with the threaded ring via the internal ridge and the external groove. The terminal of the inner tube comprises the connecting portion, and the connecting portion is connected with another component or with a metal joint of another hose assembly.

The outer wall of the inner tube comprises the first protrusion, and the inner wall of the first outer tube comprises the second protrusion. In an embodiment, a quantity of the first protrusions and a quantity of the second protrusions are both two. The second protrusions engage with the first protrusions, and the hose body is clamped between the engaged the first protrusions and the second protrusions. That is, the hose body is clamped between an engagement surface of the second protrusions and an engagement surface of the first protrusions. The engagement surface of the first protrusions and the engagement surface of the second protrusions provide forces of different directions on the hose body to form a deformed section under stress. The deformed section improves an anti-stretch capability and sealing, so that the hose assembly has excellent overall performances.

Herein in the ultrahigh-pressure acid-fracturing isodiametric hose assembly, the first outer tube and the second outer tube are sleeves out of the inner tube, and an end of the hose body is clamped under the sleeve portions. The first outer tube and the second outer tube deform under applied pressure to press against the end of the hose body tightly, and the second outer tube and the first outer tube clamp tightly under the applied pressure. The hose assembly can bear high in-pipe pressure and a large stretch without detachment between the hose and the metal joint, and has an excellent sealing performance. Leakage is improbable, a process of manufacturing is simple, and a cost of manufacturing is low.

Herein the acid-fracturing hose is further provided, which comprises the hose body of the foregoing ultrahigh-pressure acid-fracturing isodiametric hose assembly. The skeleton layer of the hose body comprises multiple steel-wire winding layers which are sequentially arranged along the radical direction of the hose body. The multiple steel-wire winding layers are divided into a group of odd sequential numbers and a group of even sequential numbers. The innermost winding layer is sequenced as the first steel-wire winding layer. The winding angles of the steel wires in the steel-wire winding layers are identical in the group of odd sequential numbers, and the winding angle of steel wire in the steel-wire winding layer decreases gradually in group of even sequential numbers from the inner steel-wire winding layer to the outer steel-wire winding layer.

Compared with the conventional oil drilling hose, the acid-fracturing hose according to embodiments of the present disclosure has improved skeleton layer, and hence has better performances in pressure resistance and small deformation under stress. The hose inner layer has performances such as high-temperature resistance, oil resistance, corrosion resistance, wear resistance, self-lubrication, and impact absorption. When conveying acid-fracturing fluid, there is small friction resistance and viscous substances such as paraffin and asphalt are less liked to adhere, thereby facilitating cleaning.

In addition, the acid-fracturing hose can maintain stable chemical properties in concentrated hydrochloric acid with concentration less than 80%, sulfuric acid with concentration less than 75%, and nitric acid with concentration less than 20%. The acid-fracturing hose has a good self-lubrication capability. The service temperature of the acid-fracturing hose can reach 80-100° C., and a continuous service life of the acid-fracturing hos can reach 8-12 months.

Herein the method for manufacturing the acid-fracturing hose is further provided, which comprises the following steps. The core rod is wrapped with the ultrahigh-molecular-weight film, the hot vulcanization is performed on the ultrahigh-molecular-weight film to acquire the ultrahigh-molecular-weight wear-resistant inner lining layer. The inner rubber is extruded out of the ultrahigh-molecular-weight wear-resistant inner lining layer, and then the ultrahigh-molecular-weight wear-resistant inner lining layer is covered with the inner rubber protective layer. The corrosion-resistant anti-leakage layer, the first intermediate rubber layer, the inner fiber-fabric layer, the second intermediate rubber layer, the skeleton layer, the twelfth intermediate rubber layer, an outer fiber-fabric layer, and the outer rubber protective layer are laid in the above-listed sequence on the inner rubber protective layer to obtain the composite layer. The composite layer is vulcanized to obtain the acid-fracturing hose. Therefore, the acid-fracturing hose can be manufactured through such method.

Since the above acid-fracturing hose has the aforementioned technical effects, the method for manufacturing the acid-fracturing hose has the same technical effects, which is not repeated herein.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

Figure 1:
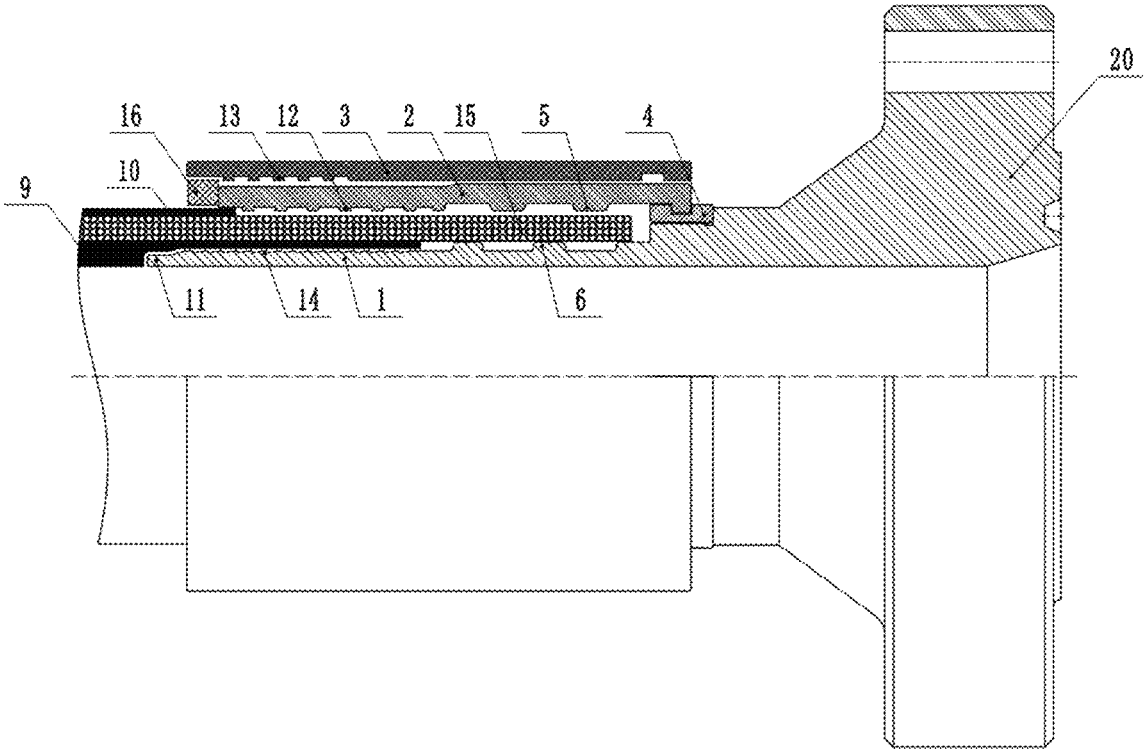
FIG. 1 is a schematic structural view of an ultrahigh-pressure acid-fracturing isodiametric hose assembly according to an embodiment of the present disclosure.

| Reference numerals: | |
| --- | --- |
| 1, inner tube; | 2, first outer tube; |
| 3, second outer tube; | 4, threaded ring; |
| 5, second protrusion; | 6, first protrusion; |
| 7, outer fiber-fabric layer; | 8, outer rubber protective layer; |
| 9, hose inner layer; | 10, hose outer layer; |
| 11, extension portion; | 12, micro-rectangular protrusion; |
| 13, micro-protrusion; | 14, hose barb; |
| 15, skeleton layer; | 16, sealant; |
| 17, ultrahigh-molecular-weight wear-resistant inner lining layer; | |
| 18, inner rubber protective layer; | 19, inner fiber-fabric layer; |
| 20, connecting portion; | 21, second intermediate rubber layer; |
| 22, corrosion-resistant anti-leakage layer; | |
| 23, first intermediate rubber layer; and | 24, twelfth intermediate rubber layer. |

DETAILED DESCRIPTION OF EMBODIMENTS

A core of embodiments of the present disclosure is to provide an ultrahigh-pressure acid-fracturing isodiametric hose assembly. The hose assembly can bear high in-pipe pressure and a large stretch without detachment between a hose and a metal joint, has an excellent sealing performance, and is less liable to leakage.

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure. In specification, claims, and drawings of the present disclosure, the terms "first", "second", and the like are intended to distinguish similar objects but do not necessarily indicate a specific order or sequence. It should be understood that data described in such manner is interchangeable where appropriate, so that embodiments of the present disclosure described herein may be implemented in an order other than that is illustrated or described herein. Moreover, the terms "include", "comprise", and any other variants thereof are intended to cover non-exclusive inclusion. For example, a process, a method, a system, a product, or a device that includes a list of steps or units is not necessarily limited to these expressly listed steps or units, but may include another step or another unit that is not expressly listed or that is inherent to such process, method, system, product, or device. The directional term such as "above", "below", "left", "right", "front", "rear", "inner", "outer", and "lateral" are merely intended for illustrating embodiments in conjunction with examples as shown in the drawings. As an example, in a tubular structure, the "inner" refers to a direction pointing toward a central axis in a plane perpendicular to the central axis, and the "outer" refers to a direction pointing away from the central axis in such plane. Hence, theses directional terms are intended for helping understand the present disclosure rather than limiting the present disclosure. In the drawings, the units having similar or identical structures are denoted by identical numerals. Moreover, when illustrating details of embodiments in conjunction with the drawings, a part of a cross section depicted in the drawing may not be enlarged in scale. The drawings are merely exemplary and hence should not be construed as a limitation to the present disclosure. In practice, a manufacture should have three-dimensional sizes such as a width, a depth, and a length.

Figure 2:
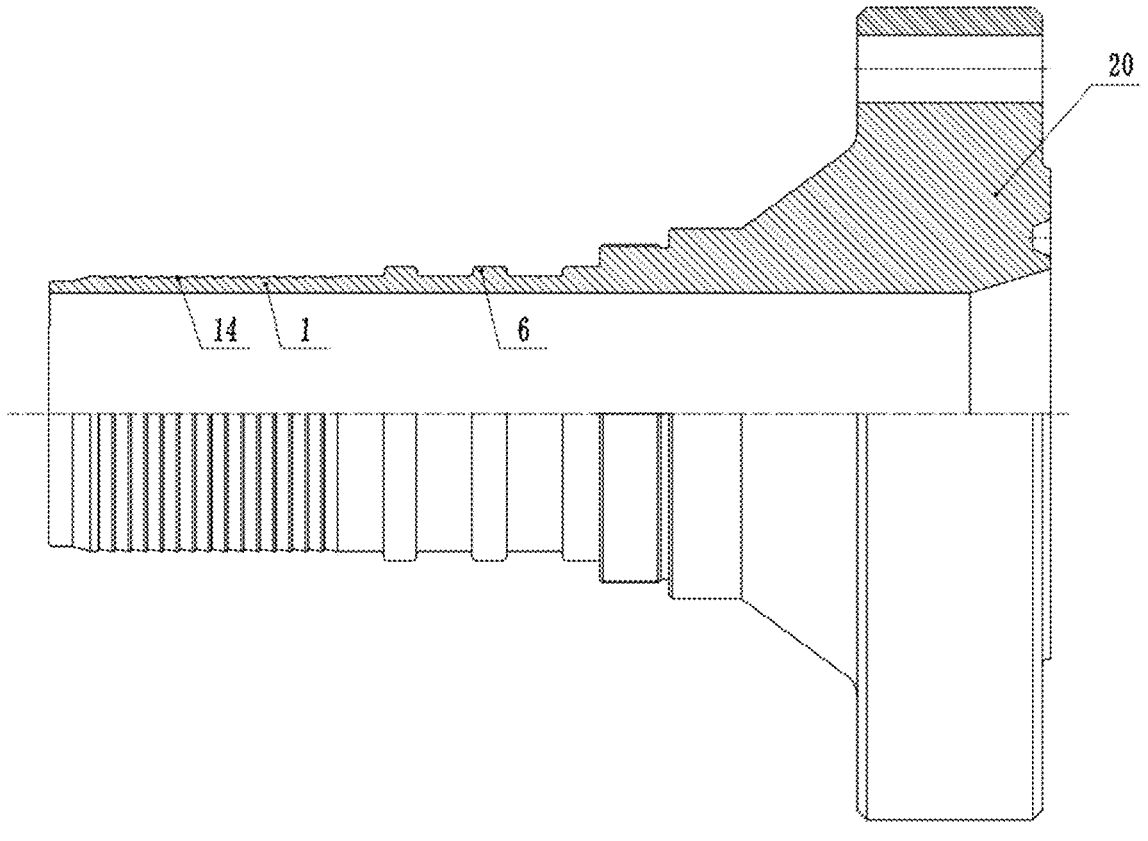
FIG. 2 is a schematic structural view of an inner tube according to an embodiment of the present disclosure.
Figure 3:
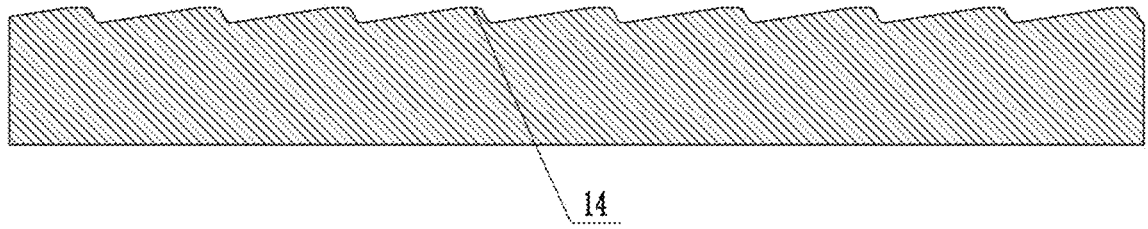
FIG. 3 is a schematic structural view of a hose barb according to an embodiment of the present disclosure.
Figure 4:
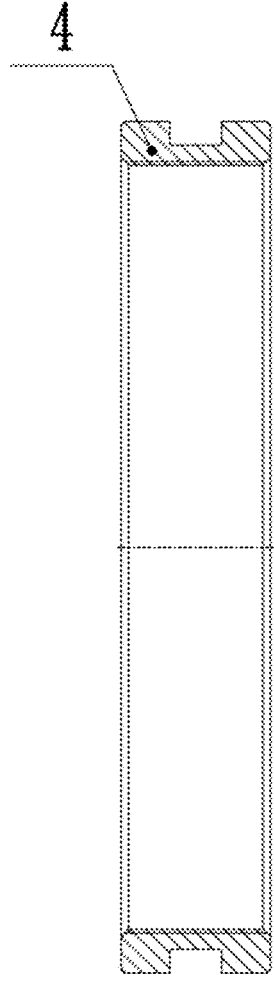
FIG. 4 is a schematic structural view of a threaded ring according to an embodiment of the present disclosure.
Figure 5:
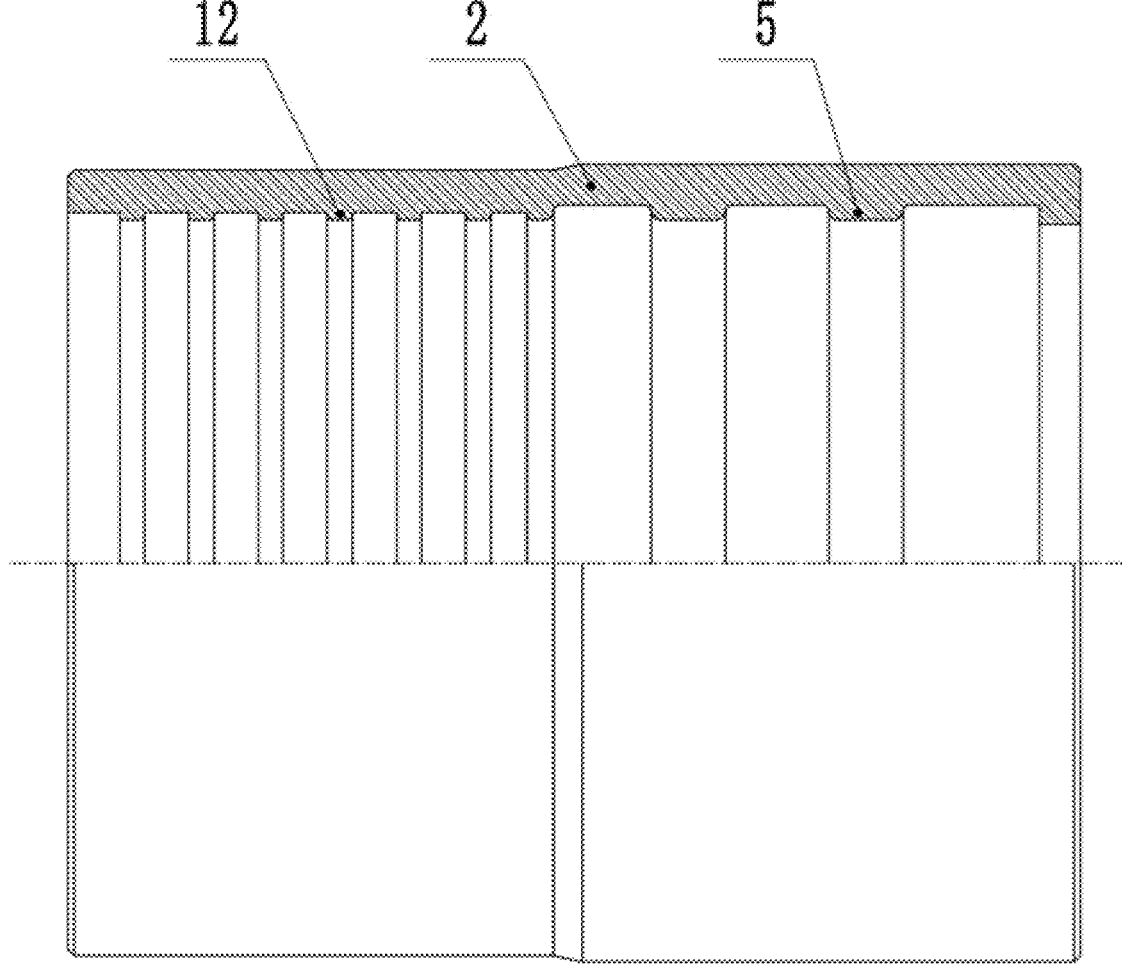
FIG. 5 is a schematic structural view of a first outer tube according to an embodiment of the present disclosure.
Figure 6:
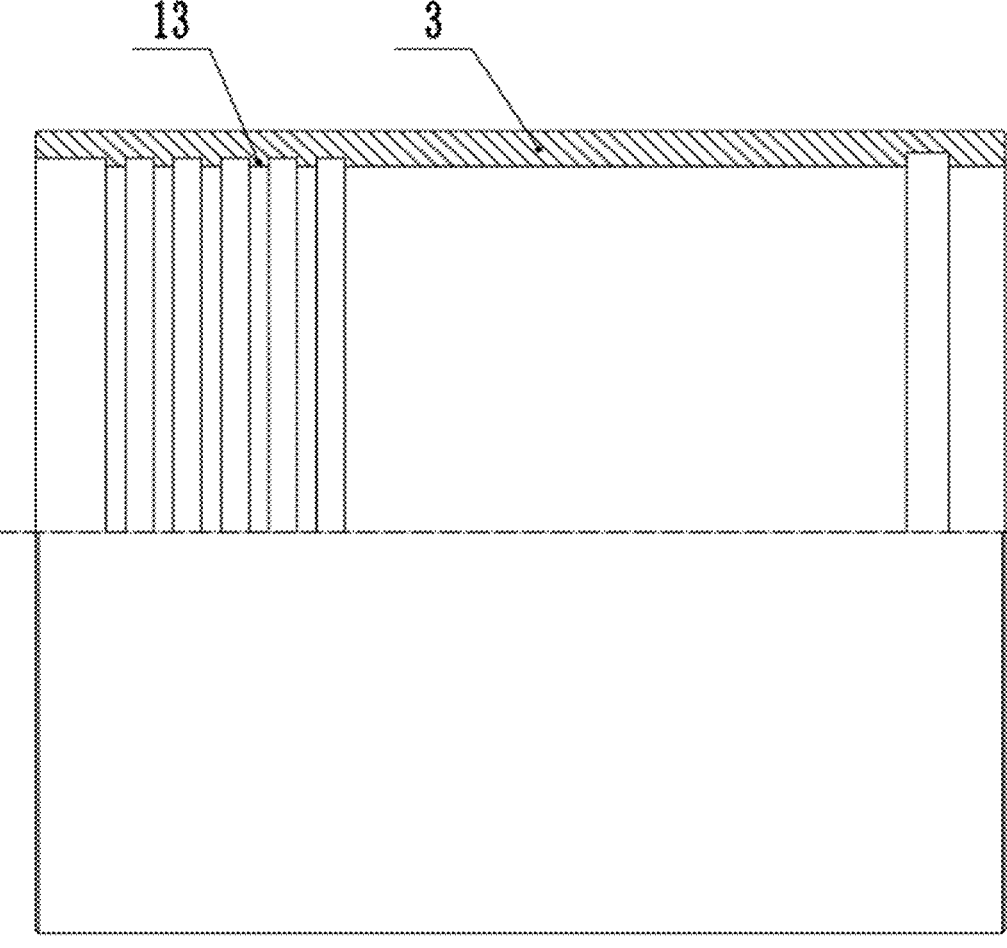
FIG. 6 is a schematic structural view of a second outer tube according to an embodiment of the present disclosure.
Figure 7:
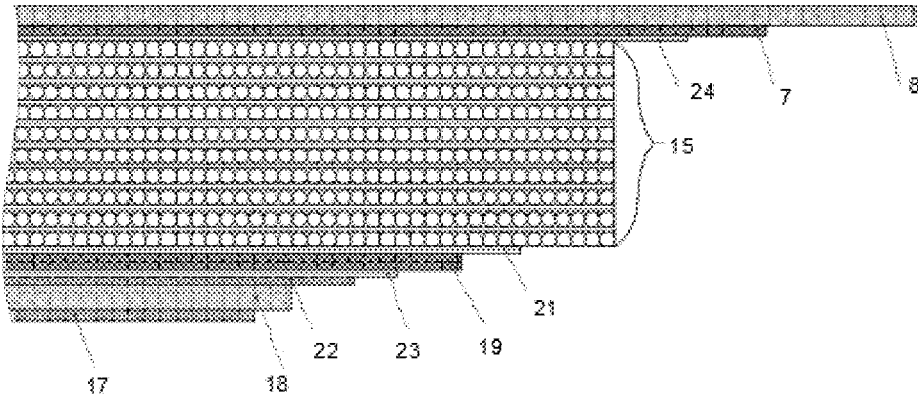
FIG. 7 is a schematic structural view of a hose body according to an embodiment of the present disclosure.

Reference is made to FIGS. 1 to 8. FIG. 1 is a schematic structural view of an ultrahigh-pressure acid-fracturing iso-diametric hose assembly according to an embodiment of the present disclosure. FIG. 2 is a schematic structural view of an inner tube. FIG. 3 is a schematic structural view of a hose barb. FIG. 4 is a schematic structural view of a threaded ring. FIG. 5 is a schematic structural view of a first outer tube. FIG. 6 is a schematic structural view of a second outer tube. FIG. 7 is a schematic structural view of a hose body.

In a specific embodiment, the ultrahigh-pressure acid-fracturing isodiametric hose assembly comprises a hose body and a metal joint. The metal joint comprises an inner tube 1, a first outer tube 2 which is a sleeve outside the inner tube 1, a second outer tube 3 which is a sleeve outside an outer wall of the first outer tube 2, and a threaded ring 4 connected with a terminal of the inner tube 1 via a thread. The first outer tube 2 and the second outer tube 3 each is an independent pressing part. An external groove for snapping is provided at an outer wall of the threaded ring 4. An end of the first outer tube 2 comprises an internal ridge for snapping which matches the external groove for snapping. The terminal of the inner tube 1 comprises a connecting portion 20. An outer wall of the inner tube comprises a first protrusion 1, and an inner wall of the first outer tube 2 comprises a second protrusion 5 engaging with the first protrusion. The hose body is clamped between the first protrusion 6 and the second protrusion 5 that are engaged. An inner wall of the second outer tube 3 comprises multiple micro-protrusions 13.

In the above structure, the ultrahigh-pressure acid-fracturing isodiametric hose assembly comprises the hose body and the metal joint. The metal joint comprises the inner tube 1, the first outer tube 2, the second outer tube 3, and the threaded ring 4. The hose body is clamped in the metal joint and between the inner tube 1 and a combination which comprises the first outer tube 2, the second outer tube 3, and the threaded ring 4.

The first outer tube 2 is the sleeve located outside the inner tube 1, the second outer tube 3 is the sleeve located on the outer wall of the first outer tube 2, and the inner wall of the second outer tube 3 comprises multiple micro-protrusions 13 which press against the outer wall of the first outer tube 2 tightly. Herein a dimension and a shape of the micro-protrusions 13 are not specifically limited, as long as the micro-protrusions are protrusions located at the inner wall of the second outer tube 3 and are capable to generate a pressure on the outer wall of the first outer tube 2. In some embodiments, a dimension of each micro-protrusions 13 is smaller than that of the first protrusion 6 and the second protrusion 5. Herein using a structure of double outer tubes, in which the first outer tube 2 and the second outer tube 3 each is an independent pressing part, can improve a utilization rate of materials, reduce deformation of the stressed outer tube when pressing, and strengthen anti-pressure capability of the hose assembly.

The threaded ring 4 has internal threads, the terminal of the inner tube 1 has external threads, and the threaded ring 4 is connected with the terminal of the inner tube 2 via these threads, which facilitates assembling and disassembling.

The outer wall of the threaded ring 4 comprises the external groove for snapping, a terminal of the first outer tube 2 comprises an internal ridge for snapping, which matches the external groove for snapping. For example, a shape of the internal ridge and a shape of the external groove at least partially compensate with each other, and hence the internal ridge can be inserted into the external groove. The first outer tube 2 is connected with the threaded ring 4 via the internal ridge and the external groove.

The terminal of the inner tube 1 comprises the connecting portion 20, and the connecting portion 20 is connected with another component or with a metal joint of another hose assembly.

The outer wall of the inner tube 1 comprises the first protrusion 6, and the inner wall of the first outer tube 2 comprises the second protrusion 5. In an embodiment, a quantity of the first protrusions 6 and a quantity of the second protrusions 5 are both two. It is appreciate that the first protrusions 6 and the second protrusions 5 may have different quantities. The second protrusions 5 engage with the first protrusions 6, i.e., the second protrusions 5 and the first protrusions 6 alternate in position along an axial direction for the engagement. When the inner surface of the first outer tube 2 and the outer surface of the inner tube 1 press against each other, the hose body is clamped between the engaged the first protrusions 5 and the second protrusions 6. That is, the hose body is clamped between an engagement surface of the second protrusions 6 and an engagement surface of the first protrusions 5. Herein the engagement surfaces refer to those by which two components are engaged. As shown in FIG. 1, the engagement surface of the first protrusions 6 may refer to a surface of a part of the outer wall of the inner tube 1 at which the first protrusions 6 are located, and the engagement surface of the second protrusions 5 may refer to a surface of a part of the inner wall of the first outer tube 2 at which the second protrusions 5 are formed. The engagement surface of the first protrusions 6 and the engagement surface of the second protrusions 5 provide forces of different directions on the hose body to form a deformed section under stress. The deformed section improves an anti-stretch capability and sealing, so that hose assembly has excellent overall performances.

Preferably, the first protrusion, the second protrusion, and the micro-protrusions may be rectangular, trapezoidal, circular-cambered, or the like, which is not specifically limited herein as long as the same function can be achieved.

Herein in the ultrahigh-pressure acid-fracturing isodiametric hose assembly, the first outer tube 2 and the second outer tube 3 are sleeves out of the inner tube 1, and an end of the hose body is clamped under the sleeve portions. The first outer tube 2 and the second outer tube 3 deform under applied pressure to press against the end of the hose body tightly, and the second outer tube 3 and the first outer tube 2 clamp tightly due to the applied pressure. The hose assembly can bear high in-pipe pressure and a large stretch without detachment between the hose and the metal joint, and has an excellent sealing performance. Leakage is improbable, a process of manufacturing is simple, and a cost of manufacturing is low.

The above ultrahigh-pressure acid-fracturing isodiametric hose assembly is only a preferable solution, and details are not limited thereto. Adjustments can be made on such basis according to an actual requirement to obtain different embodiments. The outer wall of the inner tube 1 has a hose barb 14. The hose barb 14 may be a barb-shaped protrusion and is configured to prevent the hose body from sliding toward detachment from the metal joint. A height of the hose barb 14 is smaller than a height of the first protrusion 6, and the hose barb 14 is arranged close to a tail end of the inner tube 1.

In practice, the hose barb 14 and the first protrusion 6 form composite protrusions on the inner tube 1. The hose barb 14 is close to the tail end, and the first protrusion 6 is close to the terminal, or close to the connecting portion 20. Herein the tail end of the inner tube 1 refers to an end at which the metal joint connects the hose body, that is, an end far away from the connecting portion 20, and the terminal of the inner tube 1 refers to an end away from the hose by, that is, an end close to the connecting portion 20. As shown in FIG. 1, the tail end of the inner tube 1 refers to the left end of the inner tube, and the terminal of the inner tube 1 refers to the right end of the inner tube 1. Hereinafter the terminal and the tails end of other components are defined likewise.

The hose barb 14 is applied on an inner surface of the hose body, and presses the inner surface of the hose body, which improves sealing between the hose body and the inner tube 1. The height of the hose barb 14 is smaller than the height of the first protrusion 6. The larger height of the first protrusion 6 engenders a large, appropriate deformation of the skeleton layer 15 of the hose body, or a continuous wave-like deformation of a wall of the hose body, which improves anti-stretch capability of the hose assembly.

On a basis of the foregoing embodiments, the inner wall of the first outer tube 2 comprises multiple micro-rectangular protrusions 12. Herein a dimension of the micro-rectangular protrusions 12 is not specifically limited. In an embodiment, the dimension of the micro-rectangular protrusions 12 is smaller than that of the second protrusion. Moreover, a height of each micro-rectangular protrusion 12 is smaller than a height of the second protrusion 5, and the micro-rectangular protrusions 12 are arranged close to a tail end of the first outer tube 2.

In practice, the first protrusion 6 of the inner tube 1 and the second protrusion 5 of the first outer tube 2 in the hose assembly are aligned in a non-overlapping manner. The inner wall of the first outer tube 2 comprises multiple micro-rectangular protrusions 12, each of which has a height smaller than the height of the second protrusion 5. After the first outer tube 2 being pressed, the first outer tube 2 close to the tail end has a smaller diameter with respect to a part at the terminal, which improves the anti-stretch capability of the hose assembly greatly. In addition, the inner tube 1 is made of an integrally-forged high-strength material, which is coarsely lathed, tempered, and finely lathed. Such material has strength and hardness much greater than those of a material of the first outer tube 2. The material of the first outer tube 2 is required to be more ductile than that of the inner tube 1. Hence, the skeleton layer 15 of the hose body is less deformed at the first protrusion 6 when an external pressure is applied.

On a basis of the foregoing embodiments, the first protrusion 6, the second protrusion 5, and the micro-rectangular protrusions 12 are chamfered with a circular arc.

In practice, the first protrusion 6, the second protrusion 5, and the micro-rectangular protrusions 12 are chamfered with circular arcs of different radii. Thereby, the skeleton layer 15 is less damaged when the hose body is clamped between the engagement surfaces of the inner tube 1 and the first outer tube 2.

On a basis of the foregoing embodiments, the tail end of the inner tube 1 comprises a tapered buffer portion and an isodiametric buffer portion, and the tapered buffer portion is connected with the hose barb 14.

In practice, the tail end of the inner tube 1 is provided with the tapered buffer portion and the isodiametric buffer portion. The thick end (i.e., an end having a larger outer diameter) of the tapered buffer portion is connected with the hose barb 14, and the thin end (i.e., an end having a smaller outer diameter) of the tapered buffer portion is connected with the isodiametric buffer portion. Outer diameters of the tapered buffer portion and the isodiametric buffer portion are both smaller than an outer diameter of the hose barb 14, that is, smaller than an inner diameter of the hose body. The assembly is easy to assemble, and the inner wall of the hose body and the hose inner layer 9 are less likely to be damaged.

On a basis of the foregoing embodiments, an extension portion 11 of the tail end of the inner tube 1 extends out of a tail end of the second outer tube 3. The extension portion 11 comprises the tapered buffer portion and the isodiametric buffer portion.

In practice, the extension portion 11 of the tail end of the inner tube 1 extends out of the tail end of the second outer tube 3, that is, the inner tube 1 extends out of the first outer tube 2 by the extension portion 11 when the internal ridge for snapping on the first outer tube 2 is meshed with the external groove for snapping on the threaded ring 4. In one aspect, the extension portion 11 increases a length and an area of contact between the inner surface of the hose body and the outer surface of the inner tube 1, and improves an anti-leakage performance. In another aspect, the extension portion 11 provides some support on the hose body, which can avoid a gap between the hose body and the first outer tube 2 when bending the hose body results a greatly curved hose at the tail end of the first outer tube 2.

In another reliable embodiment, on the basis of any foregoing embodiment, the first protrusion 6, the second protrusion 5, and the micro-rectangular protrusions 12 each is meshed with an inner surface or an outer surface of a skeleton layer 15.

In practice, as an embodiment, the hose body comprises an ultrahigh-molecular-weight wear-resistant inner lining layer 17, an inner rubber protective layer 18, an inner fiber-fabric layer 19, the skeleton layer 15 formed by multiple rubber wrapping layers and multiple steel-wire winding layers, an outer fiber-fabric layer 7, and an outer rubber protective layer 8, which are arranged from inside to outside. The hose body has an excellent anti-pressure capability, a good bending capability, wear resistance, corrosion resistance, and aging resistance. Moreover, the outer rubber protective layer 8 is well fireproof.

In order to further improve connection between the metal joint and the hose body and improve overall performances of the hose assembly, the first protrusion 6 and the second protrusion 5, and the micro-rectangular protrusions 12 each is meshed with the inner surface or the outer surface of the skeleton layer 15. That is, during the manufacture, the ultrahigh-molecular-weight wear-resistant inner lining layer 17, the inner rubber protective layer 18, the inner fiber-fabric layer 19, the outer fiber-fabric layer 7, and the outer rubber protective layer 8 of the hose body are peeled off at positions corresponding to the first protrusion 6 of the inner tube 1 and the second protrusion 5 of the first outer tube 2. In some embodiments, the ultrahigh-molecular-weight wear-resistant inner lining layer 17, the inner rubber protective layer 18, and the inner fiber-fabric layer 19, which correspond to the first protrusions 6 at the inner tube 1 are peeled off, and the outer fiber-fabric layer 7 and the outer rubber protective layer 8 corresponding to the second protrusions 5 at the first outer tube 2 are peeled off, so that the inner surface and the outer surface of the skeleton layer 15 match with the first protrusion 6 of the inner tube 1 and the second protrusion 5 of the first outer tube 2, respectively. Thereby, the first outer tube 2 when contracting toward a central axis compresses the skeleton layer 15 to contract toward the central axis, and some steel wires are disposed between the first protrusion 6 and the second protrusion 5. In another word, the inner surface and the outer surface of the skeleton layer 15 is wave-like shaped, which renders the connection between the hose body and the metal joint firmer. In an embodiment, the hose barb 14 bites the hose inner layer 9, so that the hose body is more difficult to be detached from the metal joint under an external force. Multiple hose barbs 14 of the inner tube 1 may bite the inner layer of the hose body.

On a basis of the foregoing embodiments, a distance between the first protrusion 6 and the inner surface of the skeleton layer 15 and a distance between the second protrusion 5 and the outer surface of the skeleton layer 15 each ranges from 2 mm to 5 mm.

As for the first outer tube 2, an outer diameter close to the tail end is smaller than an outer diameter close to the threaded ring 4 by a difference ranges from 2 mm to 4 mm. For example, the outer diameter at an edge of the tail end is smaller than an outer diameter at an edge of the threaded ring 4 by the difference ranges from 2 mm to 4 mm.

In practice, the distance between the first protrusion 6 and the inner surface of the skeleton layer 15 and the distance between the second protrusion 5 and the outer surface skeleton layer 15 each is an arbitrary distance ranging from 2 mm to 5 mm, such as 3 mm or 4 mm. The outer diameter of the first outer tube 2 close to the tail end is smaller than the outer diameter of the first outer tube 2 close to the threaded ring 4 by an arbitrary difference ranging from 2 mm to 4 mm, such as 3 mm. Thereby, assembling is ensured to be feasible while reserving a margin for pressing different sections of the first outer tube 2. The outer diameter of the pressed first outer tube 2 is kept as consistent as possible among different sections, and hence the outer diameter of the second outer tube 3 pressed in a subsequent step can be kept consistent, which also enhances industrial beauty.

On a basis of the foregoing embodiments, an inner wall of the hose body comprises a hose inner layer 9, an inner diameter of the inner tube 1 is identical to an inner diameter of the hose inner layer 9, and the inner tube 1 is embedded in the hose inner layer 9 when the hose body connects with the metal joint.

In practice, the inner tube 1 being embedded in the hose inner layer 9 ensures that the inner tube 1 of the metal joint has the same inner diameter as the hose inner layer 9 after being pressed. Hence, an isodiametric hose assembly is formed, which avoids vortex.

On a basis of the foregoing embodiments, the outer wall of the hose body comprises a hose outer layer 10. A layer of sealant 16 is uniformly applied between the second outer tube 3 and the hose outer layer 10, and an end-face of the hose outer layer 10 abuts against an end-face of a tail end of the first outer tube 2. In some embodiments as shown in FIG. 1, the tail end of the first outer tube overlaps with the hose outer layer 10 along the axial direction of the hose body.

In practice, after assembly is assembled, the layer of sealant 16 is uniformly applied between the second outer tube 3 and the hose outer layer 10, which not only improves the sealing at the tail end but also prevents corrosion of rain and air on the skeleton layer 15.

In addition, an acid-fracturing hose is provided according to embodiments of the present disclosure. The skeleton layer of the hose body comprises the multiple steel-wire winding layers which are sequentially arranged along a radical direction of the hose body. An innermost one of the wire winding layers is a steel-wire winding layer having a sequential number of 1. A winding angle a steal wire in each steel-wire winding layer with an odd sequential number is $\alpha$, and $\alpha$ ranges from 53.0 degrees to 54.0 degrees. A periodical length of a steel wire in one of the steel-wire winding layers which has a sequential number of n is identical to a periodical length of a steel wire in another of the steel-wire winding layers which has a sequential number of n−1, when n is an even number.

That is, the multiple steel-wire winding layers are divided into a group of odd sequential numbers and a group of even sequential numbers. The innermost winding layer is sequenced as the first steel-wire winding layer. The winding angles of the steel wires in the steel-wire winding layers are all equal to a in the group of odd sequential numbers, and a ranges from 53.0 degrees to 54.0 degrees. A periodical length of the steel wire in the $n^{th}$ steel-wire winding layer is identical to that of the steel wire in the $(n-1)^{th}$ steel-wire winding layer when n is an even number.

In the group of odd sequential numbers, the winding angles of the steel wires of the steel-wire winding layer range from 53.0 degrees to 54.0 degrees. The periodical lengths of the adjacent steel-wire winding layers, which has odd and even sequential numbers, can be calculated based on a formula T=$\pi$D/tan $\alpha$, where T is the periodical length, D is the outer diameter of the current steel-wire winding layer, and $\alpha$ is the winding angle of the steel wire of the steel-wire winding layer in the group of odd sequential numbers. Accordingly, winding angles and the periodical length in each layer having the odd sequential numbers and each layer having the even sequential number can be obtained successively.

Each steel-wire winding layers is formed by winding a steel wire in spiral.

Figure 8:
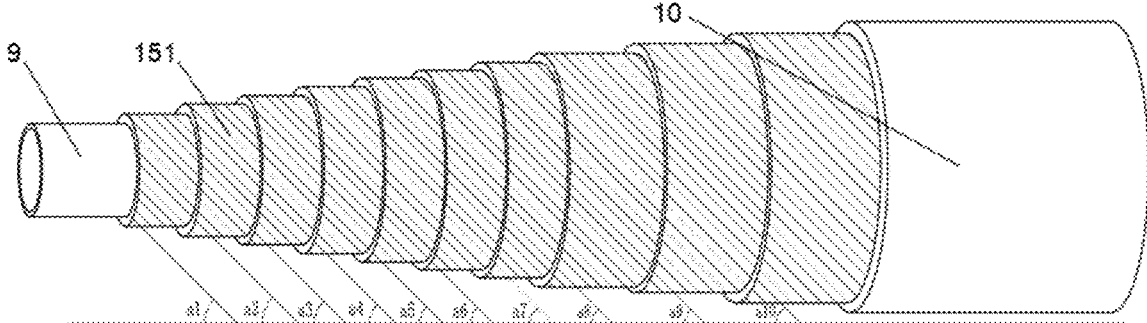
FIG. 8 is a schematic structural view of a skeleton layer according to an embodiment of the present disclosure.

Specifically, the skeleton layer 15 is compounded on the second intermediate rubber layer 21 of the acid-fracturing hose. In an embodiment, a quantity of the steel-wire winding layers is 10. A specific winding method is as shown in FIG. 8, which is illustrated as follows.

It is taken as an example that the acid-fracturing hose having an inner diameter of 127.0 mm. In the first steel-wire winding layer, the winding angle $\alpha$1 is 53.50 degrees and the outer diameter is 163.1 mm. In the second steel-wire winding layer, the winding angle $\alpha$2 is 54.85 degrees, and the outer diameter is 167.8 mm. The standard periodical length is 373.8 mm, or a range of the periodical length is 370.9 mm to 375.2 mm.

In the third steel-wire winding layer, the winding angle $\alpha$3 is 53.50 degrees and the outer diameter is 172.5 mm. In the fourth steel-wire winding layer, the winding angle $\alpha$3 is 54.75 degrees, and the outer diameter is 177.2 mm. The standard periodical length is 395.7 mm, or a range of the periodical length is 392.8 mm to 397.1 mm.

In the fifth steel-wire winding layer, the winding angle $\alpha$5 is 53.50 degrees and the outer diameter is 181.9 mm. In the sixth steel-wire winding layer, the winding angle $\alpha$6 is 54.61 degrees, and the outer diameter is 186.6 mm. The standard periodical length is 415.7 mm, or a range of the periodical length is 414.6 mm to 418.9 mm.

In the seventh steel-wire winding layer, the winding angle $\alpha$7 is 53.50 degrees and the outer diameter is 191.3 mm. In the eighth steel-wire winding layer, the winding angle $\alpha$8 is 54.50 degrees, and the outer diameter is 196.0 mm. The standard periodical length is 439.4 mm, or a range of the periodical length is 436.5 mm to 440.8 mm.

In the ninth steel-wire winding layer, the winding angle $\alpha$9 is 53.50 degrees and the outer diameter is 200.7 mm. In the tenth steel-wire winding layer, the winding angle $\alpha$8 is 54.37 degrees, and the outer diameter is 205.4 mm. The standard periodical length is 461.2 mm, or a range of the periodical length is 458.3 mm to 462.6 mm.

The hose is designed as follows.

Optimum processing parameters are determined according to a theory of hose processing design, for example, a thickness of inner rubber, a diameter of a reinforcement layer, a periodical length, a spool tension, an outer diameter, and a density.

$\Phi$127 mm×103.5 Mpa is taken as an example (where $P_B$ is 232.9 MPa). Copper-plated steel wires having different diameters may be selected, and a quantity i of steel-wire winding layers and a diameter d of the steel wire are determined according to the following equations.

Compressive strength is calculated as follows.

$$P_B = \frac{0.735 \cdot Kb \cdot \sum N}{D_{calculated}^2} \cdot C$$

$$K_b = K_B \times \frac{\pi d^2}{4} \times 100$$

$$\sum N = \pi D_{calculated} \cdot i \cdot \rho \cdot \cos\frac{\alpha}{d}$$

$$K_B = 2150 \cdot \frac{N}{m^2}$$

$P_B$ in MPa is a bursting pressure of the hose. $K_b$ in N/mm$^2$ is strength of the steel wire. N is a quantity of the steel wires in one layer. d in cm is a diameter of the steel wire. $D_{calculated}$ in cm is an average diameter of the skeleton layer, i is a quantity of the steel-wire winding layer. $\rho$ is an average density of the steel-wire winding layer. C is an overall correction coefficient.

$P_B$ is calculated to be 241.6 for the above winding manner, which meets a set requirement of 232.9 MPa on the bursting pressure.

Therefore, the basic design parameters of the hose are: i=10, d=2.2 mm, winding angles are 53.50°, 54.85°, 53.50°, 54.75°, 53.50°, 54.61°, 53.50°, 54.50°, 53.50°, and 54.37°, and periodical lengths are 373.8 mm, 395.7 mm, 417.5 mm, 439.4 mm, and 461.2 mm.

In order to demonstrate the performance of the optimized hose structure, five control groups are established for comparison. The diameters of the acid-fracturing hoses in the five control groups are $\Phi$51 mm, $\Phi$64 mm, $\Phi$76 mm, $\Phi$102 mm, and $\Phi$152 mm, respectively. Each control group comprises two test groups differing only in the winding angles of the steel wires. Specific test results are as illustrated in following tables.

TABLE 1

Performance indexes before and after optimization on winding
angles of acid-fracturing hose haivng diameter of Φ51 mm

| Model | Opeartion indexes | Before optimization | | After optimization | |
|---|---|---|---|---|---|
| Φ51 | Steel wire diameter | Φ1.2 | | Φ1.2 | |
| | Winding angle | 50.1 51.4 52.6 53.7 54.8 55.7 56.7 57.8 | 53.5 54.85 53.5 54.75 53.5 54.61 53.5 54.50 | 53.0 54.4 53.0 54.3 53.0 54.2 53.0 54.1 | 54.0 55.3 54.0 55.2 54.0 55.1 54.0 55.0 |
| | Operation pressure | 100.2 MPa | 111.1 MPa | 110.7 MPa | 111.6 MPa |
| | Bursting pressure | 225.1 MPa | 250.0 MPa | 249.1 MPa | 251.02 MPa |
| | Deformation under pressure | −3.12% | −1.10% | −1.07% | −1.14% |

TABLE 2

Performance indexes before and after optimization on winding
angles of acid-fracturing hose haivng diameter of Φ64

| Model | Opeartion indexes | Before optimization | | After optimization | |
|---|---|---|---|---|---|
| Φ64 | Steel wire diameter | Φ1.4 | | Φ1.4 | |
| | Winding angle | 50.1 51.3 52.7 53.7 54.9 55.8 56.8 57.8 | 53.5 54.86 53.5 54.78 53.5 54.60 53.5 54.52 | 53.0 54.39 53.0 54.32 53.0 54.27 53.0 54.15 | 54.0 55.3 54.0 55.2 54.0 55.1 54.0 55.0 |
| | Operation pressure | 101.5 MPa | 107.8 MPa | 108.0 MPa | 107.2 MPa |
| | Bursting pressure | 228.3 MPa | 242.5 MPa | 243.1 MPa | 241.2 MPa |
| | Deformation under pressure | −2.6% | −0.71% | −0.81% | −0.75% |

TABLE 3

Performance indexes before and after optimization on winding
angles of acid-fracturing hose haivng diameter of Φ76

| Model | Opeartion indexes | Before optimization | | After optimization | |
|---|---|---|---|---|---|
| Φ76 | Steel wire diameter | Φ1.6 | | Φ1.6 | |
| | Winding angle | 50.1 51.4 52.6 53.7 54.8 55.7 56.7 57.8 | 53.5 54.85 53.5 54.75 53.5 54.61 53.5 54.50 | 53.0 54.39 53.0 54.33 53.0 54.27 53.0 54.15 | 54.0 55.3 54.0 55.2 54.0 55.1 54.0 55.0 |
| | Operation pressure | 98.0 MPa | 106.5 MPa | 107.2 MPa | 107.0 MPa |
| | Bursting pressure | 220.5 MPa | 239.6 MPa | 241.2 MPa | 240.7 MPa |
| | Deformation under pressure | −2.23% | −0.81% | −0.79% | −0.75% |

TABLE 4

| Model | Opeartion indexes | Before optimization | | After optimization | |
|---|---|---|---|---|---|
| Φ102 | Steel wire diameter | Φ1.8 | | Φ1.8 | |
| | Winding angle | 50.1 51.3 52.7 53.7 54.9 55.8 56.8 57.8 | 53.5 54.86 53.5 54.78 53.5 54.60 53.5 54.52 | 53.0 54.39 53.0 54.33 53.0 54.27 53.0 54.15 | 54.0 55.3 54.0 55.2 54.0 55.1 54.0 55.0 |
| | Operation pressure | 102.0 MPa | 107.2 MPa | 107.2 MPa | 107.0 MPa |
| | Bursting pressure | 229.5 MPa | 241.3 MPa | 241.2 MPa | 240.7 MPa |
| | Deformation under pressure | −2.55% | −0.60% | −0.79% | −0.75% |

Performance indexes before and after optimization on winding angles of acid-fracturing hose haivng diameter of Φ102

TABLE 5

| Model | Opeartion indexes | Before optimization | | After optimization | |
|---|---|---|---|---|---|
| Φ152 | Steel wire diameter | Φ2.2 | | Φ2.2 | |
| | Winding angle | 50.1 51.3 52.7 53.7 53.8 54.1 54.9 55.8 56.8 57.8 57.7 57.8 | 53.5 54.8 53.5 54.7 53.5 54.6 53.5 54.6 53.5 54.5 53.5 54.6 | 53.0 54.39 53.0 54.33 53.0 54.28 53.0 54.27 53.0 54.15 53.0 54.13 | 54.0 55.3 54.0 55.2 54.0 55.1 54.0 55.1 54.0 55.0 54.0 55.0 |
| | Operation pressure | 97.2 MPa | 104.5 MPa | 105.9 MPa | 104.3 MPa |
| | Bursting pressure | 218.8 MPa | 235.2 MPa | 238.2 MPa | 234.7 MPa |
| | Deformation under pressure | −2.34% | −0.40% | −0.79% | −0.75% |

Performance indexes before and after optimization on winding angles of acid-fracturing hose haivng diameter of Φ152

The above tests show that using steel-wire winding manner disclosed herein can increase the operation pressure and the bursting pressure and reduce deformation under pressure for the acid-fracturing hose.

On such basis, the winding angle of the steel wire in each steel-wire winding layer of the skeleton layer 15 is optimized, and adjacent steel-wire winding layers cooperate to increase mechanical strength of the acid-fracturing hose. The acid-fracturing hose can achieve a high operation pressure (up to 15000 PSI) and a higher bursting pressure (up to 33750 PSI). The hose not only is applicable to different geological environments or fields, such as shield machine, sand blasting machine, concrete, tunnel excavation, convey of highly corrosive fluids, drilling, and workover operations, but also has a good performance for conveying different mediums such as 28% hydrochloric acid or emery.

Compared with the conventional oil drilling hose, the acid-fracturing hose according to embodiments of the present disclosure has better performances in high-temperature resistance, oil resistance, corrosion resistance, wear resistance, self-lubrication, and impact absorption. When conveying acid-fracturing fluid, there is small friction resistance and viscous substances such as paraffin and asphalt are less liked to adhere, thereby facilitating cleaning.

In addition, the acid-fracturing hose can maintain stable chemical properties in concentrated hydrochloric acid with concentration less than 80%, sulfuric acid with concentration less than 75%, and nitric acid with concentration less than 20%. The acid-fracturing hose has a good self-lubrication capability. The service temperature of the acid-fracturing hose can reach 80-100° C., and a continuous service life of the acid-fracturing hos can reach 8-12 months.

In order to demonstrate the wear resistance of the hose after optimizing the hose structure, six control groups are established for comparison. Diameters of the acid-fracturing hoses in the six control groups are Φ51 mm, Φ64 mm, Φ76 mm, Φ102 mm, Φ127 mm, and Φ152 mm, respectively. Comparative experiments are conducted along with ordinary rubber hoses and stainless steel pipes of the same specifications. The conveyed medium is 20% to 28% hydrochloric acid containing emery with a particle size of 15 mm to 25 mm. The wear resistance of various pipes is tested according to an actual service life, which is illustrated in following tables.

TABLE 6

Wear resistance of acid-fracturing hose with diameter of Φ51

| Model | Type of pipe | Pumping capacity (bbl) |
|---|---|---|
| Φ51 | Rubber hose | 156375 |
| | Stainless steel pipe | 202568 |
| | Acid-fracturing hose provided herein | 279125 |

TABLE 7

Wear resistance of acid-fracturing hose with diameter of Φ64

| Model | Type of pipe | Pumping capacity (bbl) |
|---|---|---|
| Φ64 | Rubber hose | 166385 |
| | Stainless steel pipe | 204768 |
| | Acid-fracturing hose provided herein | 290138 |

TABLE 8

Wear resistance of acid-fracturing hose with diameter of Φ76

| Model | Type of pipe | Pumping capacity (bbl) |
|---|---|---|
| Φ76 | Rubber hose | 151368 |
| | Stainless steel pipe | 203864 |
| | Acid-fracturing hose provided herein | 281253 |

TABLE 9

Wear resistance of acid-fracturing hose with diameter of Φ102

| Model | Type of pipe | Pumping capacity (bbl) |
|---|---|---|
| Φ102 | Rubber hose | 147856 |
| | Stainless steel pipe | 212536 |
| | Acid-fracturing hose provided herein | 288653 |

TABLE 10

Wear resistance of acid-fracturing hose with diameter of Φ127

| Model | Type of pipe | Pumping capacity (bbl) |
|---|---|---|
| Φ127 | Rubber hose | 165214 |
| | Stainless steel pipe | 213789 |
| | Acid-fracturing hose provided herein | 289715 |

TABLE 11

Wear resistance of acid-fracturing hose with diameter of Φ152

| Model | Type of pipe | Pumping capacity (bbl) |
|---|---|---|
| Φ152 | Rubber hose | 154385 |
| | Stainless steel pipe | 205168 |
| | Acid-fracturing hose provided herein | 273245 |

The above tables shown that the pumping capacity of the acid-fracturing hose provided herein is not less than 270000 bbl, which is far better than that of the stainless steel pipe and the rubber hose. Therefore, the acid-fracturing hose according to embodiments of the present disclosure has better wear resistance.

Based on the above embodiments, the hose body includes an ultrahigh-molecular-weight wear-resistant inner lining layer 17, an inner rubber protective layer 18, a corrosion-resistant anti-leakage layer 22, a first intermediate rubber layer 23, an inner fiber-fabric layer 19, a second intermediate rubber layer 21, a skeleton layer 15, a twelfth intermediate rubber layer 24, an outer fiber-fabric layer 7, and an outer rubber protective layer 8, which are arranged from inside to outside. The hose inner layer 9 comprises the ultrahigh-molecular-weight wear-resistant inner lining layer 17 and the inner rubber protective layer 18. The hose outer layer 10 comprises the twelfth intermediate rubber layer 24, the outer fiber-fabric layer 7, and the outer rubber protective layer 8.

Specifically, the hose body comprises the ultrahigh-molecular-weight wear-resistant inner lining layer 17, the inner rubber protective layer 18 compounded on the ultrahigh-molecular-weight wear-resistant inner lining layer 17, the inner rubber protective layer 18 comprising an ethylene propylene diene monomer rubber layer or a natural styrene-butadiene rubber layer, the corrosion-resistant anti-leakage layer 22 compounded on the inner rubber protective layer 18, the first intermediate rubber layer 23 compounded on the corrosion-resistant anti-leakage layer 22, the first intermediate rubber layer 23 made of natural styrene-butadiene rubber, the inner fiber-fabric layer 19 compounded on the first intermediate rubber layer 23, the second intermediate rubber layer 21 compounded on the inner fiber-fabric layer 19, the skeleton layer 15 compounded on the second intermediate rubber layer 21, the twelfth intermediate rubber layer 24 compounded on the skeleton layer 15, the outer fiber-fabric layer 7 compounded on the twelfth intermediate rubber layer 24, and the outer rubber protective layer 8 compounded on the outer fiber-fabric layer 7, sequentially along a radical direction of the hose body from inside to outside.

The inner rubber protective layer 18 is a natural styrene-butadiene rubber layer or an ethylene propylene diene monomer rubber layer. A material of the first intermediate rubber layer 23 includes natural styrene-butadiene rubber. The skeleton layer 15 comprises ten steel-wire winding layers that are arranged from inside to outside, and an intermediate rubber layer is provided between each pair of adjacent steel-wire winding layers. Each steel-wire winding layer is formed by winding a steel wire in spiral.

In the skeleton layer 15, strength grade of steel wires are selected, for example, to be Φ0.8×3050 MPa, Φ1.2×2750 MPa, Φ1.6×2450 MPa, Φ1.8×2450 MPa, Φ2.0×2250 MPa, or Φ2.2×2150 MPa, according to different pressures;

The ultrahigh-molecular-weight wear-resistant inner lining layer 17 is provided at an inner side of the hose body, so as to provide strong high-temperature resistance, oil resistance, corrosion resistance, wear resistance, self-lubrication, and an impact absorption capability.

Herein the acid-fracturing hose adopts layer groups may of specific materials, and the layer groups cooperate with each other to provide good overall performances, such as a mechanical performance, wear resistance, corrosion resistance, and an anti-leakage performance, of the acid-fracturing hose.

Moreover, the corrosion-resistant anti-leakage layer 22 is provided between the inner rubber protective layer 18 and the skeleton layer 15. The anti-leakage layer has good chemical corrosion resistance and can resist erosion and permeation of acid-fracturing fluid effectively, which improves the service life of the acid-fracturing hose.

In production, a surface of each steel-wire winding layer is coated brass coating, which increases a bonding force between the steel wire and the rubber, that is, increases strength of connection between the steel wire and the intermediate rubber layer. In addition, the coating itself is easy to be shaped and processed and can be deformed along with the steel wire, which facilitates pulling.

More specifically, the ultrahigh-molecular-weight wear-resistant inner lining layer 17 includes 8 to 12 films, and a thickness of each film is 0.15 mm. A thickness of the inner rubber protective layer 18 ranges from 9 mm to 11 mm. The corrosion-resistant anti-leakage layer 22 comprises 4 to 6 film, and a thickness of each film is 0.15 mm. A thickness of each intermediate rubber layer ranges from 0.3 mm to 0.6 mm. A thickness of the outer rubber protective layer 8 ranges from 2.5 mm to 4.0 mm. The inner fiber-fabric layer 19 and the outer fiber-fabric layer 7 each comprises several layers of cord fabric, and a thickness of each layer of cord fabric ranges from 0.8 mm to 1.2 mm.

A method for manufacturing an acid-fracturing hose is further provided, which comprises following steps S1 to S4.

In step S1, a core rod is wrapped with an ultrahigh-molecular-weight film, and hot vulcanization is performed on the ultrahigh-molecular-weight film to acquire an ultrahigh-molecular-weight wear-resistant inner lining layer 17. Thereby, the ultrahigh-molecular-weight wear-resistant inner lining layer 17 has performances such as high-temperature resistance, oil resistance, corrosion resistance, wear resistance, self-lubrication, and impact absorption, which improves operation performances and a service life of the acid-fracturing hose.

In step S2, an inner rubber is extruded out of the ultrahigh-molecular-weight wear-resistant inner lining layer 17, and then the ultrahigh-molecular-weight wear-resistant inner lining layer 17 is covered with the inner rubber protective layer 18.

In step S3, a corrosion-resistant anti-leakage layer 22, a first intermediate rubber layer 23, an inner fiber-fabric layer 19, a second intermediate rubber layer 21, a skeleton layer 15, a twelfth intermediate rubber layer 24, an outer fiber-fabric layer 7, and an outer rubber protective layer 8 are laid in the above-listed sequence on the inner rubber protective layer to obtain a composite layer. Similarly, the anti-leakage layer 22 enables the acid-fracturing hose to have good chemical corrosion resistance. That is, the acid-fracturing hose can resist the erosion and permeation of the acid-fracturing fluid effectively.

In step S4, the composite layer is vulcanized to obtain the acid-fracturing hose.

In an embodiment, laying the corrosion-resistant anti-leakage layer 22, the first intermediate rubber layer 23, the inner fiber-fabric layer 19, the second intermediate rubber layer 21, the skeleton layer 15, the twelfth intermediate rubber layer 24, the outer fiber-fabric layer 7, and the outer rubber protective layer 8 in the above-listed sequence on the inner rubber protective layer 18 comprises following steps S31 to S33.

In step S31, the corrosion-resistant anti-leakage layer 22 is laid on the inner rubber protective layer 18. In step S32, the corrosion-resistant anti-leakage layer 22 is wrapped with the first intermediate rubber layer 23 and then the inner fiber-fabric layer 19, then another hot vulcanization is performed on the inner fiber-fabric layer 19, and then an adhesive is uniformly applied on the inner fiber-fabric layer 19. Preferably, the adhesive may be CHEMLOK adhesive, such as CHEMLOK 250.

In step S33, the inner fiber-fabric layer 19 is wrapped with the second intermediate rubber layer 21, the skeleton layer 15, the twelfth intermediate rubber layer 24, the outer fiber-fabric layer 7, and the outer rubber protective layer 8 in the above-listed sequence.

On the basis of the above embodiments, wrapping the core rod with the ultrahigh-molecular-weight film and performing hot vulcanization on the ultrahigh-molecular-weight film to acquire the ultrahigh-molecular-weight wear-resistant inner lining layer 17 comprises a following step S11.

In step S11, the core rod is wrapped with a first ultrahigh-molecular-weight film, and the hot vulcanization is performed on the first ultrahigh-molecular-weight film to acquire the ultrahigh-molecular-weight wear-resistant inner lining layer 17. A temperature of the hot vulcanization ranges from 145° C. to 155° C., and duration of the hot vulcanization ranges from 30 min to 40 min.

Performing the other hot vulcanization on the inner fiber-fabric layer and then applying the adhesive on the inner fiber-fabric layer comprises a following step S321.

In step S321, the other hot vulcanization is performed on the inner fiber-fabric layer and then a layer of CHEMLOK 250 is applied on the inner fiber-fabric layer. A temperature for the other vulcanization ranges from 155° C. to 165° C., and duration of the other vulcanization ranges from 10 min to 15 min.

Vulcanizing the composite layer to obtain the acid-fracturing hose comprises a following step S41.

In step S41, the composite layer is disposed under pressure ranging from 0.5 Mpa to 0.6 Mpa and a temperature ranging from 150° C. to 170° C. for one hour and then the temperature is lowered to implement the vulcanizing and obtain the acid-fracturing hose.

On the basis of the above embodiments, the inner rubber protective layer 18 is compounded on the ultrahigh-molecular-weight wear-resistant inner lining layer 17. Herein the inner rubber protective layer 18 may be the natural styrene-butadiene rubber layer, and is made of following raw materials in parts by weight.

The raw materials comprise 20 to 26 parts of natural rubber, 50 to 60 parts of styrene-butadiene rubber, 15 to 20 parts of sodium acrylate ionic polymer, 3 to 8 parts of zinc oxide, 0.2 to 0.8 part of sulfur, 6 to 8 parts of vulcanization accelerator, 68 to 72 parts of reinforcing agent, 15 to 20 parts of softener, 3 to 8 parts of tackifying resin; 1 to 5 parts of antioxidant, and 0.1 to 0.5 parts of anti-caking agent.

First Embodiment

The inner rubber protective layer 18 is made of the raw materials comprising, in parts by weight, 20 parts of natural rubber, 50 parts of styrene-butadiene rubber, 15 parts of sodium acrylate ionic polymer, 3 parts of zinc oxide, 0.2 part of sulfur, 6 parts of vulcanization accelerator, 68 parts of reinforcing agent, 15 parts of softener, 3 parts of tackifying resin; 1 part of antioxidant; and 0.3 parts of anti-caking agent.

Second Embodiment

The inner rubber protective layer 18 is made of the raw materials comprising, in parts by weight, 24 parts of natural rubber, 58 parts of styrene-butadiene rubber, 18 parts of sodium acrylate ionic polymer, 5 parts of zinc oxide, 0.5 part of sulfur, 7 parts of vulcanization accelerator, 70 parts of reinforcing agent, 18 parts of softener, 5 parts of tackifying resin, 3 parts of antioxidant, and 0.2 parts of anti-caking agent.

Third Embodiment

The inner rubber protective layer 18 is made of the raw materials comprising, in parts by weight, 26 parts of natural rubber, 60 parts of styrene-butadiene rubber, 20 parts of sodium acrylate ionic polymer, 8 parts of zinc oxide, 0.8 part of sulfur, 8 parts of vulcanization accelerator, 72 parts of reinforcing agent, 20 parts of softener, 8 parts of tackifying resin, 5 parts of antioxidant, and 0.4 parts of anti-caking agent.

Herein the sodium acrylate ionic polymer may be Surlyn 1802 produced by DuPont; the softener may be trioctyl trimellitate, and the tackifying resin may be phenolic resin or coumarone resin.

In one embodiment, the vulcanization accelerator comprises vulcanization accelerator MBS and vulcanization accelerator TMTD, and a mass ratio of the vulcanization accelerator MBS and the vulcanization accelerator TMTD ranges from 5:2 to 6:1.

In one embodiment, the reinforcing agent comprises carbon black N550 and carbon black N774, and a mass ratio of the carbon black N550 and the carbon black N774 is 3:2.

In one embodiment, the antioxidant comprises antioxidant 4020 and antioxidant MB, and a mass ratio of the antioxidant 4020 and the antioxidant MB is 7:3.

In addition, the method for manufacturing the inner rubber protective layer 18 comprises following steps S1 to S3.

In step S1, raw materials are weighed in parts by weight, comprising: 20 to 26 parts of natural rubber, 50 to 60 parts of styrene-butadiene rubber, 15 to 20 parts of sodium acrylate ionic polymer, 3 to 8 parts of zinc oxide, 0.2 to 0.8 part of sulfur, 6 to 8 parts of vulcanization accelerator, 68 to 72 parts of reinforcing agent, 15 to 20 parts of softener, 3 to 8 parts of tackifying resin, 1 to 5 parts of antioxidant, and 0.1 to 0.5 parts of anti-caking agent.

In step S2, the raw materials are mixed uniformly and then melted at a temperature ranging from 80 to 100° C., and then glue discharging of the raw materials is performed under 110° C. to obtain a glue-discharged mixture.

In step S3, the glue-discharged mixture, 0.2 to 0.8 parts of sulfur, and 6 to 8 parts of vulcanization accelerator are melted for duration ranging from 2 min to 5 min under a temperature ranging from 86° C. to 88° C. to obtain the inner rubber protective layer.

In one embodiment, the composite layer is wrapped with a water cloth when being vulcanized. Herein a source of the water cloth is not strictly limited, and may be a common commodity.

The water cloth is configured to apply a certain pressure on the hose to prevent excessive expansion of the rubber hose being heated.

In one embodiment, an armored stainless steel layer is provided as a sleeve outside the outer rubber protective layer 8 after the outer rubber protective layer 8 is laid.

In one embodiment, a nylon protective layer is provided as a sleeve outside the outer rubber protective layer 8 after the outer rubber protective layer 8 is laid.

The embodiments of the present disclosure are described in a progressive manner, and each embodiment places emphasis on the difference from other embodiments. Embodiments may refer to each other with respect to the same or similar parts.

Hereinabove the ultrahigh-pressure acid-fracturing isodiametric hose assembly according to embodiments of the present disclosure is described in detail. Specific examples are used in this specification to illustrate the principle and implementation of the present disclosure. The description of the above embodiments is only intended for facilitating understanding of the method and core concept of the present disclosure. Those skilled in the art may make various improvements and modifications on a basis the present disclosure without departing from the principle of the present disclosure, and these improvements and modifications also fall within the protection scope of claims of the present disclosure. Therefore, the present disclosure is not limited to the embodiments described herein but conforms to a widest scope in accordance with principles and novel features disclosed in the present disclosure.

The invention claimed is:

1. An ultrahigh-pressure acid-fracturing isodiametric hose assembly, comprising a hose body and a metal joint, wherein:

the metal joint comprises an inner tube, a first outer tube which is configured to serve as a sleeve outside the inner tube, a second outer tube which is configured to serve as a sleeve outside an outer wall of the first outer tube, and a threaded ring configured to be connected with a terminal of the inner tube via a thread;

the first outer tube is capable to press against the inner tube independently, and the second outer tube is capable to press against the outer wall of the first outer tube independently;

an external groove for snapping is provided at an outer wall of the threaded ring;

an end of the first outer tube comprises an internal ridge for snapping which matches the external groove for snapping;

the terminal of the inner tube comprises a connecting portion;

an outer wall of the inner tube comprises a first protrusion, and an inner wall of the first outer tube comprises a second protrusion configured to engage with the first protrusion;

the hose body when connecting with the metal joint is clamped between the first protrusion and the second protrusion that are engaged; and an inner wall of the second outer tube comprises micro-protrusions;

an inner wall of the hose body comprises a hose inner layer, and an outer wall of the hose body comprises a hose outer layer;

the hose body comprises an ultrahigh-molecular-weight wear-resistant inner lining layer, an inner rubber protective layer, a first intermediate rubber layer, an inner fiber-fabric layer, a second intermediate rubber layer, a skeleton layer, a twelfth intermediate rubber layer, an outer fiber-fabric layer, and an outer rubber protective layer which are arranged from inside to outside;

the skeleton layer of the hose body comprises steel-wire winding layers which are sequentially arranged along a radical direction of the hose body;

an innermost one of the steel-wire winding layers is a steel-wire winding layer having a sequential number of 1;

a winding angle of a steal wire in each steel-wire winding layer with an odd sequential number is $\alpha$, and $\alpha$ ranges from 53.0 degrees to 54.0 degrees; and a periodical length of a steel wire in one of the steel-wire winding layers which has a sequential number of n is identical to a periodical length of a steel wire in another of the steel-wire winding layers which has a sequential number of n−1, when n is an even number.

2. The ultrahigh-pressure acid-fracturing isodiametric hose assembly according to claim 1, wherein the outer wall of the inner tube comprises a hose barb, a height of the hose barb is smaller than a height of the first protrusion, and the hose barb is arranged close to a tail end of the inner tube.

3. The ultrahigh-pressure acid-fracturing isodiametric hose assembly according to claim 2, wherein the inner wall of the first outer tube comprises micro-rectangular protrusions, a height of each of the micro-rectangular protrusions is smaller than a height of the second protrusion, and the micro-rectangular protrusions are arranged close to a tail end of the first outer tube.

4. The ultrahigh-pressure acid-fracturing isodiametric hose assembly according to claim 3, wherein the first protrusion, the second protrusion, and the micro-rectangular protrusions each is chamfered with a circular arc.

5. The ultrahigh-pressure acid-fracturing isodiametric hose assembly according to claim 2, wherein the tail end of the inner tube comprises a tapered buffer portion and an isodiametric buffer portion, and the tapered buffer portion is connected with the hose barb.

6. The ultrahigh-pressure acid-fracturing isodiametric hose assembly according to claim 5, wherein when the first outer tube presses against the inner tube and the second outer tube presses against the outer wall of the first outer tube, an extension portion of the tail end of the inner tube extends out of a tail end of the second outer tube, and the tapered buffer portion and the isodiametric buffer portion are located at the extension portion.

7. The ultrahigh-pressure acid-fracturing isodiametric hose assembly according claim 2, wherein the first protrusion, the second protrusion, and the micro-rectangular protrusions each is meshed with an inner surface or an outer surface of a skeleton layer.

8. The ultrahigh-pressure acid-fracturing isodiametric hose assembly according to claim 7, wherein:

a distance between the first protrusion and the inner surface of the skeleton layer ranges from 2 mm to 5 mm, and a distance between the second protrusion and the outer surface of the skeleton layer ranges from 2 mm to 5 mm; and an outer diameter of the first outer tube close to the tail end of the first outer tube is smaller than an outer diameter of the first outer tube close to the threaded ring by a difference ranging from 2 mm to 4 mm.

9. The ultrahigh-pressure acid-fracturing isodiametric hose assembly according to claim 7, wherein an outer diameter of the inner tube is identical to an inner diameter of the hose inner layer, and when the hose body is connected with the metal joint, the inner tube grips the hose inner layer through the hose barb being engaged with the hose inner layer.

10. The ultrahigh-pressure acid-fracturing isodiametric hose assembly according to claim 7, wherein and the hose assembly further comprises a sealant applied between the second outer tube and the hose outer layer, and an end-face of the hose outer layer abuts against an end-face of the tail end of the first outer tube.

11. An acid-fracturing hose, comprising the hose body of the ultrahigh-pressure acid-fracturing isodiametric hose assembly according to claim 1.

12. The acid-fracturing hose according to claim 11, wherein:

the hose inner layer comprises the ultrahigh-molecular-weight wear-resistant inner lining layer and the inner rubber protective layer; and The hose outer layer comprises the twelfth intermediate rubber layer, the outer fiber-fabric layer, and the outer rubber protective layer.

13. The acid-fracturing hose according to claim 12, wherein a corrosion-resistant anti-leakage layer provided between the inner rubber protective layer and the skeleton layer.

14. The acid-fracturing hose according to claim 13, wherein:

the ultrahigh-molecular-weight wear-resistant inner lining layer comprises films of which a quantity ranging from 8 to 12, and a thickness of each of the films is 0.15 mm;

a thickness of the inner rubber protective layer ranges from 9 mm to 11 mm;

the corrosion-resistant anti-leakage layer comprises other films of which a quantity ranging from 4 to 6, and a thickness of each of the other films is 0.15 mm;

a thickness of each of the first intermediate rubber layer, the second intermediate rubber layer, and the twelfth intermediate rubber layer ranges from 0.3 mm to 0.6 mm;

a thickness of the outer rubber protective layer ranges from 2.5 mm to 4.0 mm; and the inner fiber-fabric layer and the outer fiber-fabric layer each comprises layers of cord fabric, and a thickness of each of the layers of cord fabric ranges from 0.8 mm to 1.2 mm.

15. The acid-fracturing hose according to claim 12, wherein a surface of each steel-wire winding layer is coated with brass.

16. A method for manufacturing the hose body of the ultrahigh-pressure acid-fracturing isodiametric hose assembly according to claim 1, comprising:

wrapping a core rod with an ultrahigh-molecular-weight film, and performing hot vulcanization on the ultrahigh-molecular-weight film to acquire the ultrahigh-molecular-weight wear-resistant inner lining layer;

extruding the inner rubber out of the ultrahigh-molecular-weight wear-resistant inner lining layer, and then covering the ultrahigh-molecular-weight wear-resistant inner lining layer with the inner rubber protective layer;

laying a corrosion-resistant anti-leakage layer, the first intermediate rubber layer, the inner fiber-fabric layer, the second intermediate rubber layer, the skeleton layer, the twelfth intermediate rubber layer, the outer fiber-fabric layer, and the outer rubber protective layer in the above-listed sequence on the inner rubber protective layer to obtain a composite layer; and vulcanizing the composite layer to obtain the acid-fracturing hose;

wherein the corrosion-resistant anti-leakage layer is located between the inner rubber protective layer and the first intermediate rubber layer, and the corrosion-resistant anti-leakage layer is configured to resist erosion and permeation of acid-fracturing fluid into layers of the acid-fracturing hose.

17. The method according to claim 16, wherein laying the corrosion-resistant anti-leakage layer, the first intermediate rubber layer, the inner fiber-fabric layer, the second intermediate rubber layer, the skeleton layer, the twelfth intermediate rubber layer, the outer fiber-fabric layer, and the outer rubber protective layer in the above-listed sequence on the inner rubber protective layer comprises:

laying the corrosion-resistant anti-leakage layer on the inner rubber protective layer;

wrapping the corrosion-resistant anti-leakage layer with the first intermediate rubber layer and then the inner fiber-fabric layer, then performing another hot vulcanization on the inner fiber-fabric layer, and then applying an adhesive uniformly on the inner fiber-fabric layer; and wrapping the inner fiber-fabric layer with the second intermediate rubber layer, the skeleton layer, the twelfth intermediate rubber layer, the outer fiber-fabric layer, and the outer rubber protective layer in the above-listed sequence.

18. The method according to claim 17, wherein:

the core rod is wrapped with a first ultrahigh-molecular-weight film, and the hot vulcanization is performed on the first ultrahigh-molecular-weight film to acquire the ultrahigh-molecular-weight wear-resistant inner lining layer, wherein a temperature of the hot vulcanization ranges from 145° C. to 155° C., and duration of the hot vulcanization ranges from 30 min to 40 min;

the other hot vulcanization is performed on the inner fiber-fabric layer and then the adhesive is applied on the inner fiber-fabric layer, wherein a temperature for the other vulcanization ranges from 155° C. to 165° C., and duration of the other vulcanization ranges from 10 min to 15 min; and vulcanizing the composite layer to obtain the acid-fracturing hose comprises:

disposing the composite layer under pressure ranging from 0.5 Mpa to 0.6 Mpa and a temperature ranging from 150° C. to 170° C. for one hour and then lowering the temperature to implement the vulcanizing and obtain the acid-fracturing hose.

19. The method according to claim 17, further comprising forming the inner rubber protective layer using raw materials, wherein the raw materials in parts by weight comprises:

20 to 26 parts of natural rubber; 50 to 60 parts of styrene-butadiene rubber; 15 to 20 parts of sodium acrylate ionic polymer; 3 to 8 parts of zinc oxide; 0.2 to 0.8 part of sulfur; 6 to 8 parts of vulcanization accelerator; 68 to 72 parts of reinforcing agent; 15 to 20 parts of softener; 3 to 8 parts of tackifying resin; 1 to 5 parts of antioxidant; and 0.1 to 0.5 parts of anti-caking agent.

20. The method according to claim 19, wherein the inner rubber protective layer is manufactured through:

weighing, in parts by weight, raw materials comprising 20 to 26 parts of natural rubber, 50 to 60 parts of styrene-butadiene rubber, 15 to 20 parts of sodium acrylate ionic polymer, 3 to 8 parts of zinc oxide, 0.2 to 0.8 part of sulfur, 6 to 8 parts of vulcanization accelerator, 68 to 72 parts of reinforcing agent, 15 to 20 parts of softener, 3 to 8 parts of tackifying resin, 1 to 5 parts of antioxidant, and 0.1 to 0.5 parts of anti-caking agent;

mixing the raw materials uniformly, then melting the raw materials at a temperature ranging from 80 to 100° C., and then performing glue discharging of the raw materials under 110° C. to obtain a glue-discharged mixture; and melting the glue-discharged mixture, 0.2 to 0.8 parts of sulfur and 6 to 8 parts of vulcanization accelerator for duration ranging from 2 min to 5 min under a temperature ranging from 86° C. to 88° C. to obtain the inner rubber protective layer.

* * * * *